US009168655B2

(12) United States Patent
Rohs et al.

(10) Patent No.: US 9,168,655 B2
(45) Date of Patent: Oct. 27, 2015

(54) CIRCUIT ARRANGEMENT AND METHOD FOR MONITORING A HAZARDOUS DEVICE BY EVALUATING THE ACCELERATION

(75) Inventors: Markus Rohs, Schieder-Schwalenberg (DE); Juergen Teutenberg, Ruethen (DE); Celarie Marceraus Donbou Kenfouet, Bad Pyrmont (DE)

(73) Assignee: Phoenix Contact GmbH & Co. KG (DE)

( * ) Notice: Subject to any disclaimer, the term of this patent is extended or adjusted under 35 U.S.C. 154(b) by 619 days.

(21) Appl. No.: 13/444,990

(22) Filed: Apr. 12, 2012

(65) Prior Publication Data

US 2012/0265325 A1    Oct. 18, 2012

(30) Foreign Application Priority Data

Apr. 14, 2011   (DE) .......................... 10 2011 017 050
Aug. 31, 2011   (DE) .......................... 10 2011 111 532

(51) Int. Cl.
G05B 9/02       (2006.01)
B25J 9/16       (2006.01)
G05B 19/4062    (2006.01)

(52) U.S. Cl.
CPC ........... B25J 9/1674 (2013.01); G05B 19/4062 (2013.01); *G05B 2219/24193* (2013.01); *G05B 2219/24196* (2013.01); *G05B 2219/49138* (2013.01)

(58) Field of Classification Search
None
See application file for complete search history.

(56) References Cited

U.S. PATENT DOCUMENTS

| 5,251,144 | A  | * | 10/1993 | Ramamurthi ................ 700/177 |
| 5,265,472 | A  | * | 11/1993 | Pfeifle et al. ................ 73/514.02 |
| 6,241,435 | B1 | * | 6/2001  | Huang et al. ................ 409/141 |
| 7,872,827 | B2 | * | 1/2011  | Shu et al. ................ 360/75 |
| 2003/0050735 | A1 | | 3/2003 | Griffis |
| 2006/0116849 | A1 | | 6/2006 | Taniguchi et al. |

(Continued)

FOREIGN PATENT DOCUMENTS

| DE | 4136355    | A1 | 5/1993 |
| DE | 19719454   | A1 | 1/1999 |
| DE | 102004026185 | A1 | 12/2005 |

(Continued)

OTHER PUBLICATIONS

Dr. Dirk Schrader, "German Patent Application No. 10 2011 111 532.7 Office Action", Nov. 14, 2012, Publisher: German Patent Office, Published in: DE.

(Continued)

*Primary Examiner* — Sean Shechtman
(74) *Attorney, Agent, or Firm* — Kaplan Breyer Schwarz & Ottesen, LLP

(57) ABSTRACT

A circuit arrangement which comprises at least two acceleration sensors for measuring an acceleration of at least one part of the hazardous device, at least one logic circuit for evaluating measured values of the at least two acceleration sensors, at least one memory for storing a comparison value, and at least one safety device controlled by an output of the logic circuit. The safety device is adapted to bring the hazardous device into a safe state in response to a switching command received via the output of the logic circuit. The logic circuit transmits the switching command to the safety device when the measured acceleration of the part of the hazardous device or a value derived from the measured acceleration has a predetermined ratio to the stored comparison value. Furthermore, a method for monitoring a hazardous device is also disclosed.

11 Claims, 3 Drawing Sheets

(56) References Cited

U.S. PATENT DOCUMENTS

2010/0023205 A1* 1/2010 Schmitt .......................... 701/34
2010/0217558 A1* 8/2010 Tan et al. ...................... 702/141

FOREIGN PATENT DOCUMENTS

| DE | 102005005995 | A1 | 6/2006 |
| DE | 102008062978 | A1 | 6/2010 |
| WO | 0194158 | A1 | 12/2001 |

OTHER PUBLICATIONS

"Parallel European Patent Application No. EP 12 00 2590", "Search Report", Jun. 24, 2015, Publisher: EPO, Published in: EP.

* cited by examiner

CIRCUIT ARRANGEMENT AND METHOD FOR MONITORING A HAZARDOUS DEVICE BY EVALUATING THE ACCELERATION

CROSS-REFERENCE TO RELATED APPLICATIONS

German patent application DE 10 2011 017 050.2, filed Apr. 14, 2011, and German patent application DE 10 2011 111 532.7, filed Aug. 31, 2011 are incorporated herein by reference.

FIELD OF THE INVENTION

The invention relates in general to safety technology and in particular to a circuit arrangement and a method for monitoring a hazardous device by evaluating the acceleration.

BACKGROUND OF THE INVENTION

The detection of movements is typically carried out in safety technology today via rotary encoders, resolvers or initiators. Acceleration sensors are frequently used today in mobile telephones, game consoles and in motor vehicle navigation.

From DE 10 2008 062 978 A1 a handling machine and a method for the operation thereof are known, wherein for the automatic recognition of an exceptional situation, such as, for example, exceeding a specified acceleration value, a sensor is provided, via which a device is activated, which realizes, for example, the function of a safety relay for stopping a robot arm movement.

SUMMARY OF THE INVENTION

The object of the invention is to disclose a way of making the monitoring of a hazardous device easier, safer and/or more cost-effective. In particular it is the object of the invention to disclose a circuit arrangement and a method with which a monitoring of this type can be carried out.

A circuit arrangement according to the invention for monitoring a hazardous device accordingly comprises at least two acceleration sensors for measuring an acceleration of at least a part of the hazardous device, at least one logic circuit for evaluating measured values of the at least two acceleration sensors, at least one memory for storing a comparison value, and at least one safety device controlled by an output of the at least one logic circuit.

The safety device is embodied in response to a switching command received via the output of the at least one logic circuit, to bring the hazardous device into a safe state, wherein the at least one logic circuit transmits the switching command to the at least one safety device when the measured acceleration of the at least one part of the hazardous device or a value derived from the measured acceleration has a predetermined ratio to the stored comparison value. Preferably, a test is carried out of whether the measured acceleration or a value derived therefrom, such as, for example, a speed or a position, falls below or exceeds the predetermined comparison value. Several comparison values, such as, for example, an upper and a lower limit value for establishing a desired range for acceleration, speed or position can also be stored, wherein a switching command is generated by the respective value if the lower limit value is fallen below or if the upper limit value is exceeded.

A hazardous device as defined by the present invention is any technical device from which emanates a non-negligible danger for persons and/or material goods. For example, the hazardous device can be a machine or installation of an automation system. The part of the hazardous device, the acceleration of which is monitored, can be a tool attached to a robot arm, for example.

In principle, any suitable type of acceleration sensor can be used, for example, a piezoelectric transducer or a sensor embodied as a micro-electromechanical system (MEMS).

Depending on the intended use, the acceleration sensors can be preferably embodied to measure linear accelerations in one, two or three directions in space. Advantageously, for each measured direction in space an output signal proportional to the respective acceleration is generated by the respective acceleration sensor, wherein the output signals depending on the embodiment can be provided in an analog or digital manner. For certain purposes it can furthermore be advantageous that the at least one acceleration sensor is embodied to measure an angular acceleration, wherein this can also be carried out for one, two or three spatial axes.

An increased level of safety is advantageously achieved by means of the dual-channel embodiment with two acceleration sensors. Particularly preferably, a separate logic circuit is respectively assigned to each of the acceleration sensors, wherein in particular a separate safety device is controlled by each of the separate logic circuits. In this manner two independent channels are formed which can bring the hazardous device into a safe state redundantly.

The at least one logic circuit can be advantageously embodied to determine the speed and/or the position of the at least one part of the hazardous device from the measured values of the acceleration sensors. This can be carried out, for example, by the integration of the measured acceleration values. However, over time due to the addition of measurement errors the mathematical integration of the acceleration values can lead in the long run to a false assumption of the real speed or position. The logic circuit, also referred to below as a logic unit, therefore advantageously has inputs in order to signal a certain position, such as, for example, a start position or intermediate position of a predetermined movement, or a condition such as, for example, start, stop or reset, to the logic unit in order to reset the addition of the measurement errors. Furthermore, an input can be provided, via which a limit value is fed to the logic unit, which limit value is stored in the memory. Preferably, each of the logic units has a corresponding memory for this purpose.

Advantageously, the logic units of the redundant channels are connected to one another in order to exchange data with one another. To simplify the circuit arrangement an input for feeding certain data can therefore be advantageously provided at only one logic unit, wherein this forwards the received data to the further logic units. Accordingly, preferably only at least one of the logic circuits has an input in order to feed to the logic circuit a limit value and/or initialization data for initializing the determined speed and/or position of the at least one part of the hazardous device. The logic units can furthermore also exchange the measured acceleration values with one another.

In a preferred embodiment, the circuit arrangement is further embodied to test the measured values of the at least two acceleration sensors for plausibility. For this purpose, advantageously a comparison of the measured values or measured variables respectively determined therefrom, such as the speed or the acceleration, determined by different acceleration sensors is carried out. In particular for this purpose the corresponding measured values or measured variables can be exchanged between at least two logic circuits, which are assigned respectively to different acceleration sensors. In a normal case, the different sensors supply essentially identical measured values or derived measured variables that have essentially the same value. If the plausibility test produces values deviating from one another for different sensors, this indicates a malfunction of at least one sensor. The plausibility test thus serves to check the sensors, wherein advantageously, depending on the result of the plausibility test, a corresponding signal is provided to an output of the circuit arrangement. The plausibility test is preferably carried out by at least one of the logic circuits.

To avoid common cause failures, caused, for example, by a common structural error of the acceleration sensors, which could lead to an undesirable cancellation of the redundancy, the two acceleration sensors are particularly preferably arranged offset to one another by a predetermined angle, wherein the respectively assigned logic unit is adapted to the evaluation of the respectively different signals of the acceleration sensors arranged offset to one another. An adaptation of this type can be carried out in a simple manner when acceleration sensors are used that are embodied to measure accelerations in three directions in space, and the acceleration sensors are arranged offset by a rotation about the z axis by 90°, since in this case in the evaluation only the x and y axes need to be interchanged. However, advantageously any other angle, for example 45°, can also be used.

In a preferred embodiment, the angular offset of the acceleration sensors is achieved in that each of the acceleration sensors is respectively arranged in the same manner on a separate circuit board, wherein the circuit boards are arranged offset to one another by a predetermined angle.

To bring the hazardous device into a safe state, it can preferably be switched off. Accordingly, the at least one safety device is advantageously embodied to disconnect the power supply of the hazardous device. Preferably, the at least one safety device for this purpose has a relay or a semiconductor switch embodied as a transistor, for example. Alternatively, the safety device can be embodied, for example, for activating a brake device, which is suitable for bringing the hazardous device into a safe state by means of a braking operation. Depending on the embodiment of the hazardous device, further embodiments of the safety device are conceivable.

Advantageously, the circuit arrangement can furthermore be embodied at least in part as an integrated circuit, wherein the integrated circuit with corresponding embodiment of the components can comprise the logic units and/or the acceleration sensors and/or the safety devices. Separate integrated circuits can also be provided for each channel.

A method for monitoring a hazardous device comprises the measurement of an acceleration of at least a part of the hazardous device by means of at least two acceleration sensors, wherein the measured values of the least two acceleration sensors are evaluated by at least one logic circuit. At least one safety device is controlled by an output of the at least one logic circuit, wherein the at least one logic circuit transmits a switching command to the at least one safety device when the measured acceleration of the at least one part of the hazardous device or a value derived from the measured acceleration has a predetermined ratio to a stored comparison value, and wherein the at least one safety device in response to the received switching command brings the hazardous device into a safe state.

BRIEF DESCRIPTION OF THE DRAWINGS

The invention is described more precisely below by way of example based on preferred embodiments and with reference to the attached drawings. Identical reference numbers in the drawings thereby designate identical or similar parts. They show.

DETAILED DESCRIPTION

Figure 1:
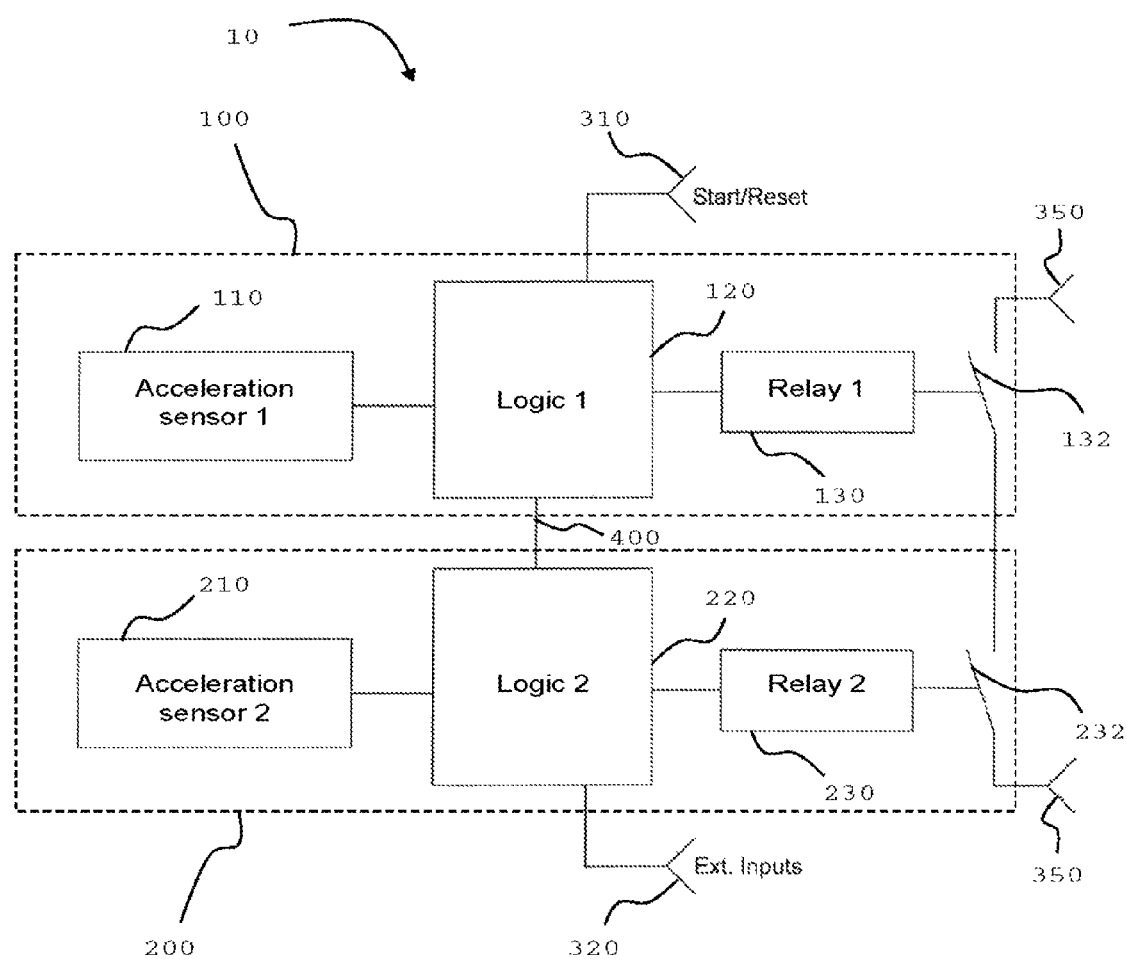
FIG. 1 a diagrammatic block diagram of a preferred embodiment of a circuit arrangement according to the invention, FIG. 2 diagrammatically a first preferred arrangement of the components shown in FIG. 1, FIG. 3 diagrammatically a second preferred arrangement of the components shown in FIG. 1, and FIG. 4 diagrammatically a third preferred arrangement of the components shown in FIG. 1.

FIG. 1 shows a diagrammatic block diagram of a preferred embodiment of a circuit arrangement 10 according to the invention for monitoring a hazardous device, such as, for example, a machine or installation, not shown. In the example shown the hazardous device is connected to the power supply via the connections 350 such that the opening of one of the switches 132 or 232 leads to a disconnection of the power supply and thus to the switching off of the hazardous device.

The circuit arrangement 10 is embodied in a dual-channel manner with a first channel 100 and a second channel 200, wherein each of the channels 100 or 200 has an acceleration sensor 110 or 210, a logic unit 120 or 220 and a relay 130 or 230 for switching respectively the one of the switches 132 or 232.

The acceleration sensors 110 and 210 are arranged on the hazardous device such that the acceleration of at least a part of the hazardous device can be measured with them. The measured values generated by the acceleration sensors 110 or 210 are respectively fed to the logic unit 120 or 220 connected to the respective acceleration sensor. The logic units 120 and 220 evaluate the received measured values and generate a switching command if the measured acceleration or a value derived therefrom lies outside a predetermined desired range or outside a predetermined limit value, wherein corresponding comparison values are stored in a memory, not shown, of the logic units. If such a switching command is generated, this is fed to the safety relay 130 or 230 connected to the respective logic unit 120 or 220, whereupon the switch 132 or 232 is opened.

In addition, the actual speed or position can be inferred through the integration of the acceleration values. Due to adding measurement errors in the integration the logic unit 120 in the exemplary embodiment shown has an input 310, via which a signal is sent to the logic unit 120 to initialize a speed and/or position derived from the measured acceleration to a defined value. Furthermore, the logic unit 120 has an input 320 for feeding parameters such as, for example, one or more comparison values to be used for the evaluation. In the exemplary embodiment shown, the information fed via the inputs 310 and 320 is exchanged via the connection 400 between the logic units 120 and 220. Furthermore, measured values or variables derived from the measured values, for example, for an averaging, can also be exchanged via the connection 400. To check the sensors used it is furthermore advantageously provided to check the measured values or variables derived from the measured values that are exchanged between the logic units 120 and 220 logically for plausibility. For this purpose, for example, it can be checked whether the measured values provided by the logic units 120 and 220 are identical. Depending on the accuracy of the measured values, alternatively it can also be checked whether the deviation of the measured values from one another exceeds a predetermined value. The result of the plausibility test can be sent for further processing via an output, not shown. Thus, for example, it can be displayed via a user interface that the measured values of different sensors deviate from one another, which indicates a malfunction.

Alternatively to the exchange of input data via the connection 400, each logic unit can also respectively have its own input for feeding the input data. Furthermore, using a suitable protocol, a single input for different input data can also be used.

Figure 2:
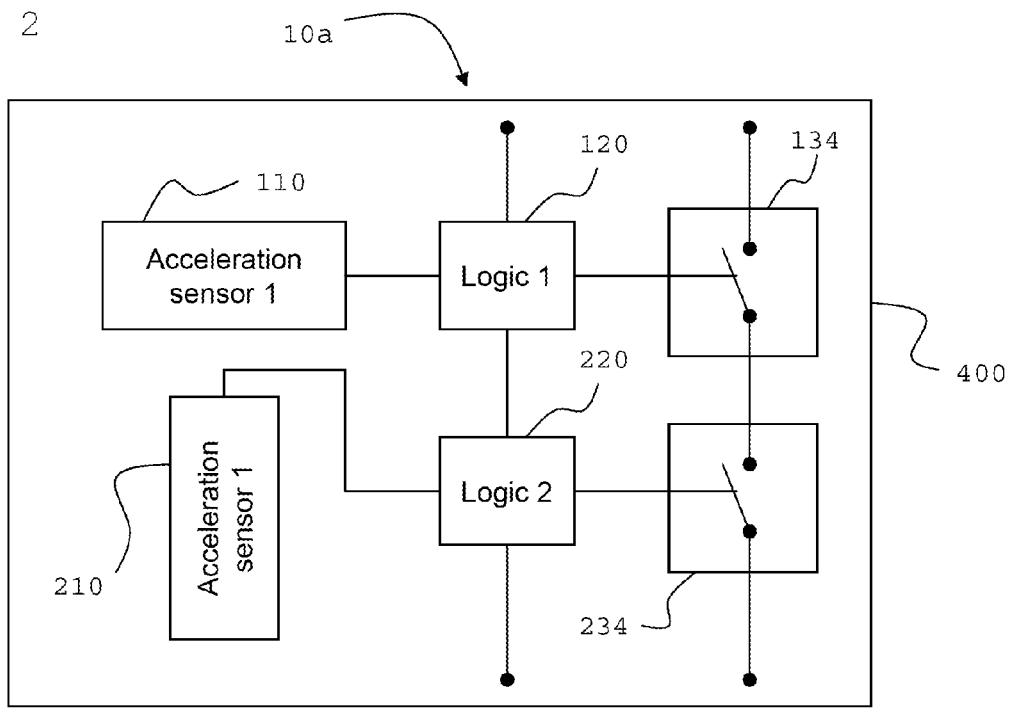
Figure 3:
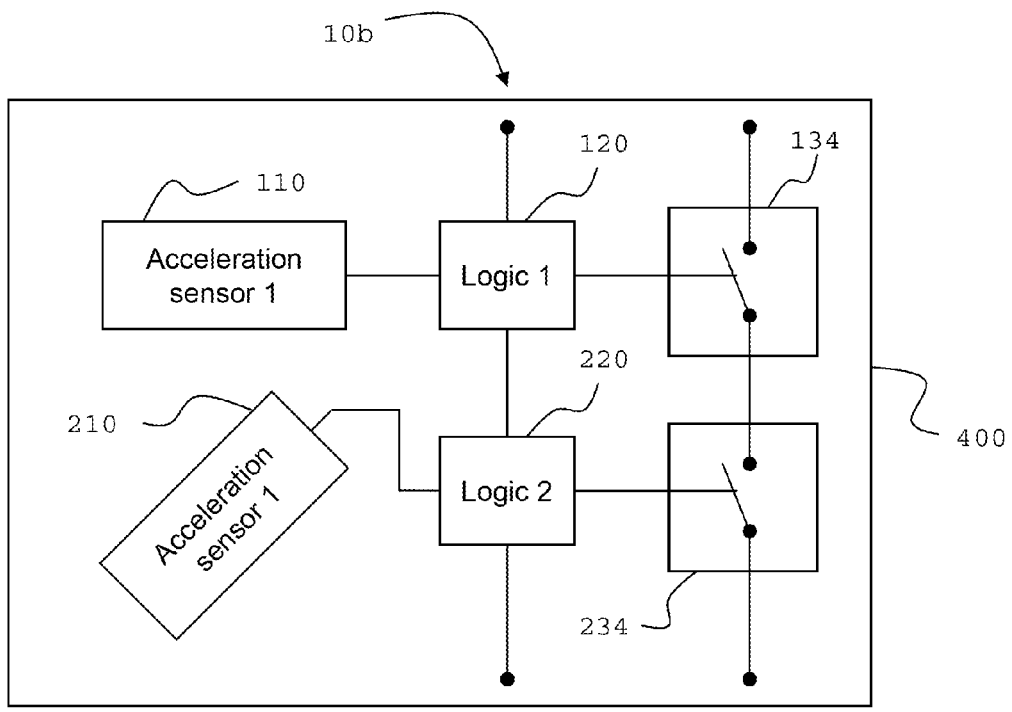
Figure 4:
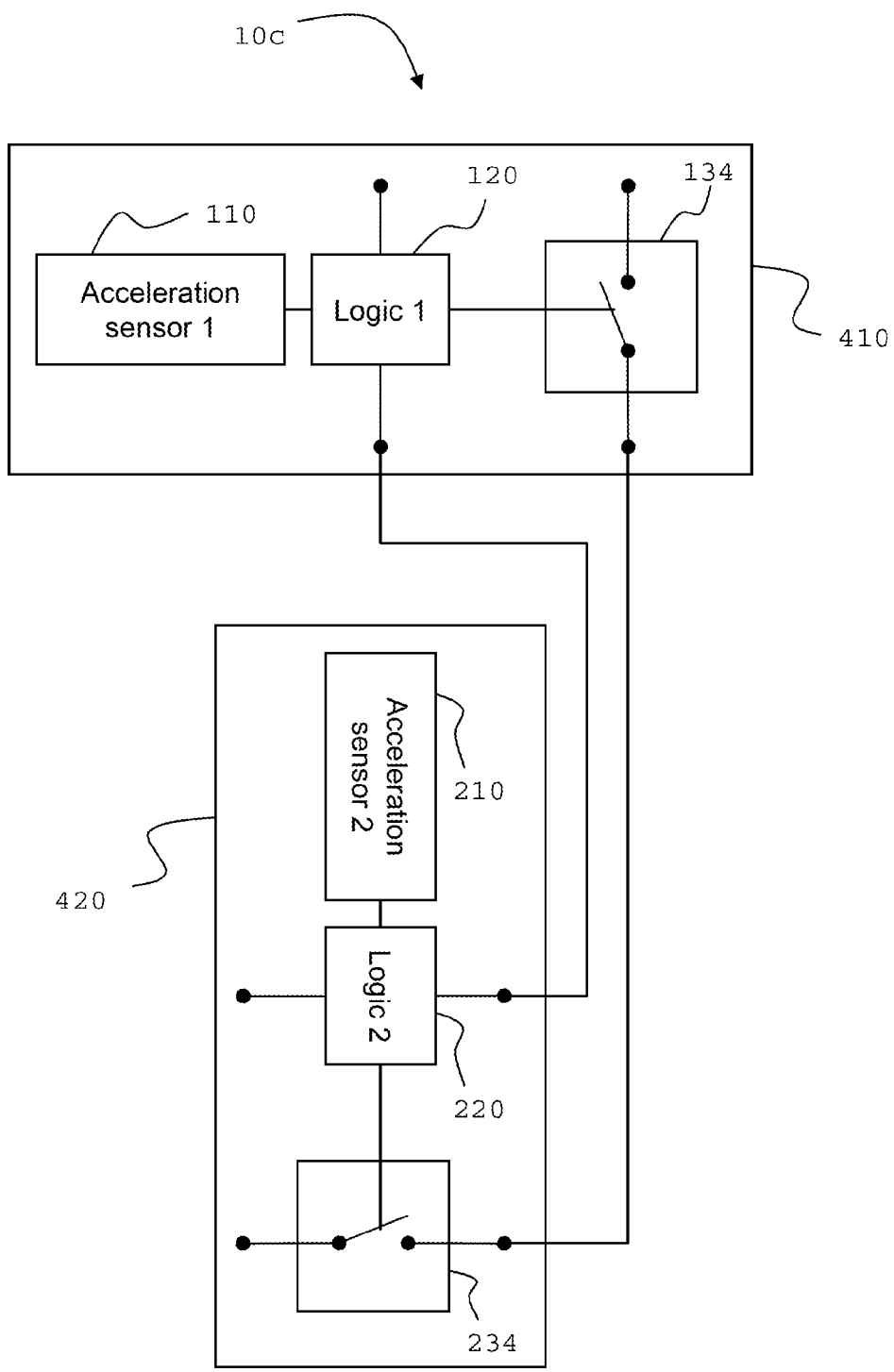

In FIGS. 2, 3 and 4 different preferred arrangements of the components shown in FIG. 1 are shown diagrammatically.

FIG. 2 shows a circuit arrangement 10a, in which the acceleration sensors 110 and 210 directly with the logic units 120 and 220 and the safe outputs 134 and 234, which can be embodied, for example, as a safety relay or semiconductor switch, are arranged in an assembly, i.e., on a common circuit board 400. Safe semiconductor outputs are advantageous in particular with high acceleration values. In the exemplary embodiment shown, the acceleration sensors 110 and 120 are arranged in a common plane but offset to one another by 90°, i.e., rotated by 90°, to avoid common cause failures.

The circuit arrangement 10b shown in FIG. 3 corresponds to that shown in FIG. 2 with the single difference that the acceleration sensors 110 and 120 are arranged offset to one another by 45° to avoid common cause failures.

In FIG. 4 a further alternative circuit arrangement 10c is shown, in which each of the acceleration sensors 110 and 210 is respectively arranged in the same manner on a separate circuit board 410 or 420, wherein the circuit boards 410 and 420 are arranged offset to one another by a predetermined angle, in the example shown by 90°.

Applications of safety technology which deal with dangerous movements, can be realized advantageously in a simple and cost-effective manner by means of the invention, at the same time ensuring a high degree of safety.

What is claimed is:

1. A circuit arrangement (10, 10a, 10b, 10c) for monitoring a hazardous device comprising:
    at least two acceleration sensors (110, 210) for measuring an acceleration of at least one part of the hazardous device, wherein the at least two acceleration sensors (110, 210) are adapted to measure accelerations in three directions in space, and wherein the at least two acceleration sensors (110, 210) are arranged offset to one another by a predetermined angle to avoid common cause failures;
    at least one logic circuit (120, 220) for evaluating measured values of the at least two acceleration sensors (110, 210);
    at least one memory for storing a comparison value; and
    at least one safety device (130, 132; 230, 232; 134; 234) controlled by an output of the at least one logic circuit (120, 220), wherein the at least one safety device is adapted to bring the hazardous device into a safe state in response to a switching command received via the output of the at least one logic circuit (120, 220), and wherein the at least one logic circuit (120, 220) transmits the switching command to the at least one safety device (130, 132; 230, 232; 134; 234) when the measured acceleration of the at least one part of the hazardous device or a value derived from the measured acceleration has a predetermined ratio to the stored comparison value;
    wherein the circuit arrangement is adapted to test the measured values of the at least two acceleration sensors (110, 210) for plausibility, comprising a comparison of the measured values or measured variables respectively determined therefrom.

2. The circuit arrangement according to claim 1, wherein a separate logic circuit (120, 220) is respectively assigned to each of the at least two acceleration sensors (110, 210).

3. The circuit arrangement according to claim 1, wherein separate logic circuits (120, 220) are connected to one another and adapted to exchange data with one another.

4. The circuit arrangement according to claim 1, wherein a separate safety device (130, 132; 230, 232; 134; 234) is controlled by each of the at least one logic circuit (120, 220).

5. The circuit arrangement according to claim 1, wherein the at least one logic circuit (120, 220) is adapted to determine the speed and/or the position of the at least one part of the hazardous device from the measured values of the at least two acceleration sensors (110, 210).

6. The circuit arrangement according to claim 1, wherein a logic circuit of the at least one logic circuit (120, 220) has an input (310, 320) in order to feed to the logic circuit (120, 220) a comparison value and/or initialization data for initializing a determined speed and/or position of the at least one part of the hazardous device.

7. The circuit arrangement according to claim 1, wherein each of the at least two acceleration sensors (110, 210) is respectively arranged in the same manner on a separate circuit board (410, 420), and wherein the circuit boards (410, 420) are arranged offset to one another by a predetermined angle.

8. The circuit arrangement according to claim 1, wherein the at least one safety device (130, 132; 230, 232; 134; 234) is adapted to disconnect the power supply of the hazardous device or to activate a brake device.

9. The circuit arrangement according to claim 1, wherein the at least one safety device (130, 132; 230, 232; 134; 234) comprises a relay (130, 230) or a semiconductor switch.

10. The circuit arrangement according to claim 1, configured at least in part as an integrated circuit.

11. A method for monitoring a hazardous device, comprising:
    measurement of an acceleration of at least one part of the hazardous device by means of at least two acceleration sensors (110, 210), wherein the at least two acceleration sensors (110, 210) are adapted to measure accelerations in three directions in space, and wherein the at least two acceleration sensors (110, 210) are arranged offset to one another by a predetermined angle to avoid common cause failures;
    storage of a comparison value;
    evaluation of measured values of the least two acceleration sensors (110, 210) by at least one logic circuit (120, 220), wherein the measured values of the at least two acceleration sensors (110, 210) are tested for plausibility, comprising a comparison of the measured values or measured variables respectively determined therefrom; and
    control of at least one safety device (130, 132; 230, 232; 134; 234) by an output of the at least one logic circuit (120, 220), wherein the at least one logic circuit (120, 220) transmits a switching command to the at least one safety device (130, 132; 230, 232; 134; 234) when the measured acceleration of the at least one part of the hazardous device or a value derived from the measured acceleration has a predetermined ratio to the stored comparison value, and wherein the at least one safety device (130, 132; 230, 232; 134; 234) in response to the received switching command brings the hazardous device into a safe state.

\* \* \* \* \*